(12) United States Patent
Pulkrabek et al.

(10) Patent No.: US 11,864,544 B2
(45) Date of Patent: *Jan. 9, 2024

(54) BAITCASTER WITH LINE GUIDE MECHANISM

(71) Applicant: TrikaUSA Inc., Superior, WI (US)

(72) Inventors: Larry Pulkrabek, Superior, WI (US); Ty Warner, Superior, WI (US); Danny Uribe, Superior, WI (US); Ron Hedberg, Superior, WI (US)

(73) Assignee: TrikaUSA Inc., Superior, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/971,336

(22) Filed: Oct. 21, 2022

(65) Prior Publication Data

US 2023/0038403 A1 Feb. 9, 2023

Related U.S. Application Data

(63) Continuation of application No. 17/073,114, filed on Oct. 16, 2020, now Pat. No. 11,528,896.

(60) Provisional application No. 62/916,513, filed on Oct. 17, 2019.

(51) Int. Cl.
*A01K 89/01* (2006.01)
*A01K 89/015* (2006.01)

(52) U.S. Cl.
CPC .. *A01K 89/01902* (2015.05); *A01K 89/01087* (2015.05)

(58) Field of Classification Search
CPC ........ A01K 89/01902; A01K 89/01087; A01K 89/0183; A01K 89/0186; A01K 89/019125
See application file for complete search history.

(56) References Cited

U.S. PATENT DOCUMENTS

| 1,973,686 A | 9/1934 | Maynes |
| 2,512,357 A | 6/1950 | Maynes |
| 4,927,095 A | 5/1990 | Young |
| 6,270,028 B1 | 8/2001 | Kim et al. |

(Continued)

FOREIGN PATENT DOCUMENTS

| CN | 1193455 A | * 9/1998 | ....... A01K 89/01917 |
| JP | H10271939 A | * 10/1998 | ......... A01K 89/0155 |
| KR | 20180006802 A | 10/2018 | |

OTHER PUBLICATIONS

International Search Report and Written Opinion in PCT/US2020/056138 dated Jan. 19, 2021 (11 pages).

(Continued)

*Primary Examiner* — Emmanuel M Marcelo
(74) *Attorney, Agent, or Firm* — Foley & Lardner LLP

(57) ABSTRACT

A baitcaster includes a spool, a guide member, and a line guide mechanism. The spool is configured to be driven to take up a fishing line. The guide member is configured to transition between a first state for let out of the fishing line and a second state for take up of the fishing line. The guide member configured to engage the fishing line at a contact point and guide the fishing line to the spool from the contact point when in the second state. The guide member is configured to be driven to rotate to reciprocatively translate the contact point along a length of the guide member. The line guide mechanism is configured to transition the guide member between the first state and the second state in response to a user input.

20 Claims, 8 Drawing Sheets

(56) References Cited

U.S. PATENT DOCUMENTS

| | | | |
|---|---|---|---|
| 7,815,137 B1 | 10/2010 | Kemp et al. | |
| 11,528,896 B2 * | 12/2022 | Pulkrabek | A01K 89/01087 |
| 2007/0007377 A1 | 1/2007 | Miyazaki et al. | |
| 2012/0104135 A1 | 5/2012 | Toma | |
| 2015/0122350 A1 | 5/2015 | Morgan et al. | |
| 2019/0191682 A1 | 6/2019 | Oogose et al. | |

OTHER PUBLICATIONS

International Search Report and Written Opinion in PCT/US2020/056149 dated Jan. 5, 2021 (13 pages).

* cited by examiner

BAITCASTER WITH LINE GUIDE MECHANISM

CROSS-REFERENCE TO RELATED PATENT APPLICATION

The present application is a continuation of U.S. application Ser. No. 17/073,114, filed Oct. 16, 2020, which claims the benefit of and priority to U.S. Provisional Patent Application No. 62/916,513, filed Oct. 17, 2019, the entire disclosures of which are all incorporated by reference herein.

BACKGROUND

The present disclosure relates generally to fishing reels. More particularly, the present disclosure relates to baitcasting fishing reels.

SUMMARY

At least one embodiment of the present disclosure relates to a baitcaster for retrieving a fishing line. The baitcaster includes a first frame member, a second frame member, a spool, and a guide member. The first frame member includes a first slot. The second frame member is positioned apart from the first frame member and includes a second slot. The spool is positioned between the first frame member and the second frame member. The spool is configured to be rotate about a spool axis to take up the fishing line. The guide member extends between the first slot of the first frame member and the second slot of the second frame member. The guide member is selectably transitionable between a first position and a second position along the first slot and the second slot. The guide member is configured to rotate about an axis extending centrally therethrough. The guide member is configured to engage the fishing line when in the second position and disengage the fishing line when transitioned into the first position.

Another embodiment of the present disclosure relates to a fishing rod. The fishing rod includes a rod and a baitcaster for retrieving a fishing line. The baitcaster includes a first frame member, a second frame member, a spool, and a guide member. The first frame member includes a first slot. The second frame member is positioned apart from the first frame member and includes a second slot. The spool is positioned between the first frame member and the second frame member. The spool is configured to be rotated about a spool axis to take up the fishing line. The guide member extends between the first slot of the first frame member and the second slot of the second frame member. The guide member is selectably transitionable between a first position and a second position along the first slot and the second slot. The guide member is configured to rotate about an axis extending centrally through the guide member. The guide member is configured to engage the fishing line when in the second position for take up of the fishing line and disengage the fishing line when transitioned into the first position for let out of the fishing line.

Another embodiment of the present disclosure relates to a baitcaster. The baitcaster includes a spool, a guide member, and a line guide mechanism. The spool is configured to be driven to take up a fishing line. The guide member is configured to transition between a first state for let out of the fishing line and a second state for take up of the fishing line. The guide member configured to engage the fishing line at a contact point and guide the fishing line to the spool from the contact point when in the second state. The guide member is configured to be driven to rotate to reciprocatively translate the contact point along a length of the guide member. The line guide mechanism is configured to transition the guide member between the first state and the second state in response to a user input.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
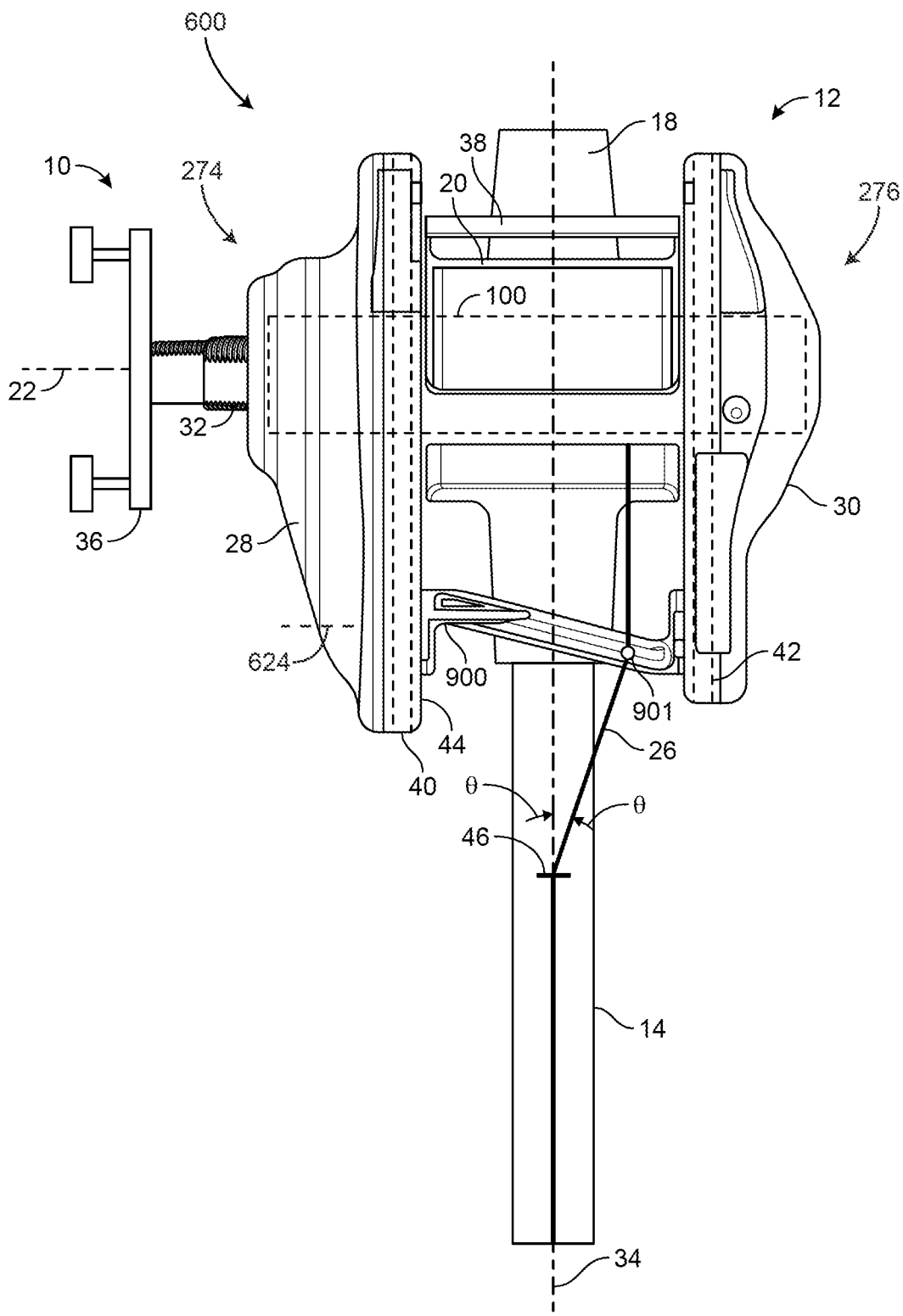
FIG. 1 is a top view of a baitcaster including a line guide and a line guide mechanism, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a fishing reel includes an elongated member or a fishing rod and a baitcaster apparatus. The baitcaster apparatus is fixedly coupled with the fishing rod and is configured to receive a torque input from a user to retrieve or take-up fishing line that extends along the fishing rod. The fishing line may extend through one or more eyelets that are positioned along the fishing rod and guide the fishing line towards the baitcaster apparatus for winding or take-up onto a spool.

The baitcaster apparatus may include body members and structural members. The body members may be spaced apart and cooperatively define an inner volume in which a spool drive mechanism is disposed. The spool drive mechanism may receive rotational kinetic energy from an input shaft that includes a handle and protrudes or extends outwards from one side of the baitcaster apparatus. The spool drive mechanism may include a ring gear that drives the spool. A guide member can be positioned between the structural and body members and may be translatable between a take-up position and a let-out position along slots of the structural members. The guide member may be positioned such that fishing line passes over and engages the guide member before being provided to the spool. The guide member may contact the fishing line at a contact point. Rotation of the guide member produces reciprocating translation of the contact point back and forth along the guide member, thereby facilitating an even distribution of fishing line onto the spool.

The baitcaster apparatus may include a line guide mechanism that is configured to transfer rotational kinetic energy from the input shaft (e.g., that is used to drive the spool to take-up the fishing line) and drive the guide member. The line guide mechanism can be positioned within an inner volume defined by one of the structural members and one of the body members (e.g., on a handle-side of the baitcaster apparatus).

The line guide mechanism can include a first gear (e.g., a compound gear), a second gear, a first linkage, and a second linkage. The compound gear includes a first sub-gear and a second sub-gear. The first sub-gear is configured to engage radially outwards facing teeth of the ring gear to receive torque or rotational kinetic energy. The first sub-gear may be rotatably fixedly coupled with the second sub-gear so that the torque is transferred to the second sub-gear. The second sub-gear is configured to engage the second gear to transfer the rotational kinetic energy to the second gear. The second gear may be rotatably fixedly coupled with the guide member and may be translatable along the slots of the structural members. In this way, rotational kinetic energy can be transferred from the input shaft, through the spool drive mechanism, through the ring gear, through the compound gear, and to the second gear and the guide member.

The line guide mechanism may be configured to drive the guide member to rotate (as described above and in greater detail below) and may also be configured to drive the guide member to translate along the slots of the structural members between the take-up position and the let-out position. The first linkage may pivotally couple with the second gear so that the first linkage may drive or translate the second gear and the guide member. An opposite end of the first linkage pivotally couples with the second linkage, which may extend in a generally arcuate or circular shape around the input shaft and the ring gear. The first linkage can be coupled with a lever that extends between the structural members of the baitcaster apparatus. The lever may be translated, pressed, moved, etc., by the user to drive the first linkage and the second linkage to transition the guide member between the take-up position and the let-out position.

Baitcaster

Figure 2:
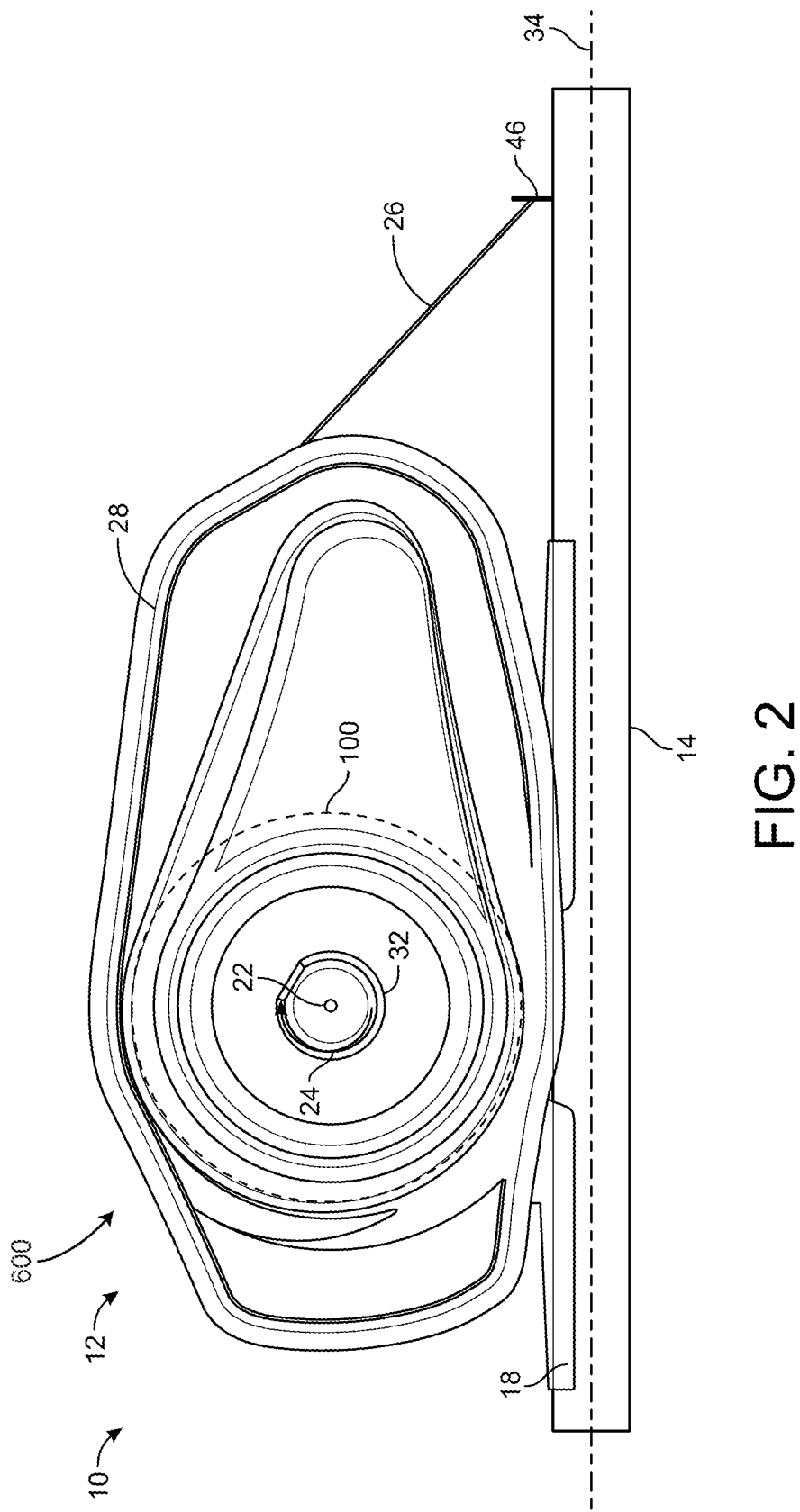
FIG. 2 is a side view of the baitcaster of FIG. 1, according to an exemplary embodiment.
Figure 3:
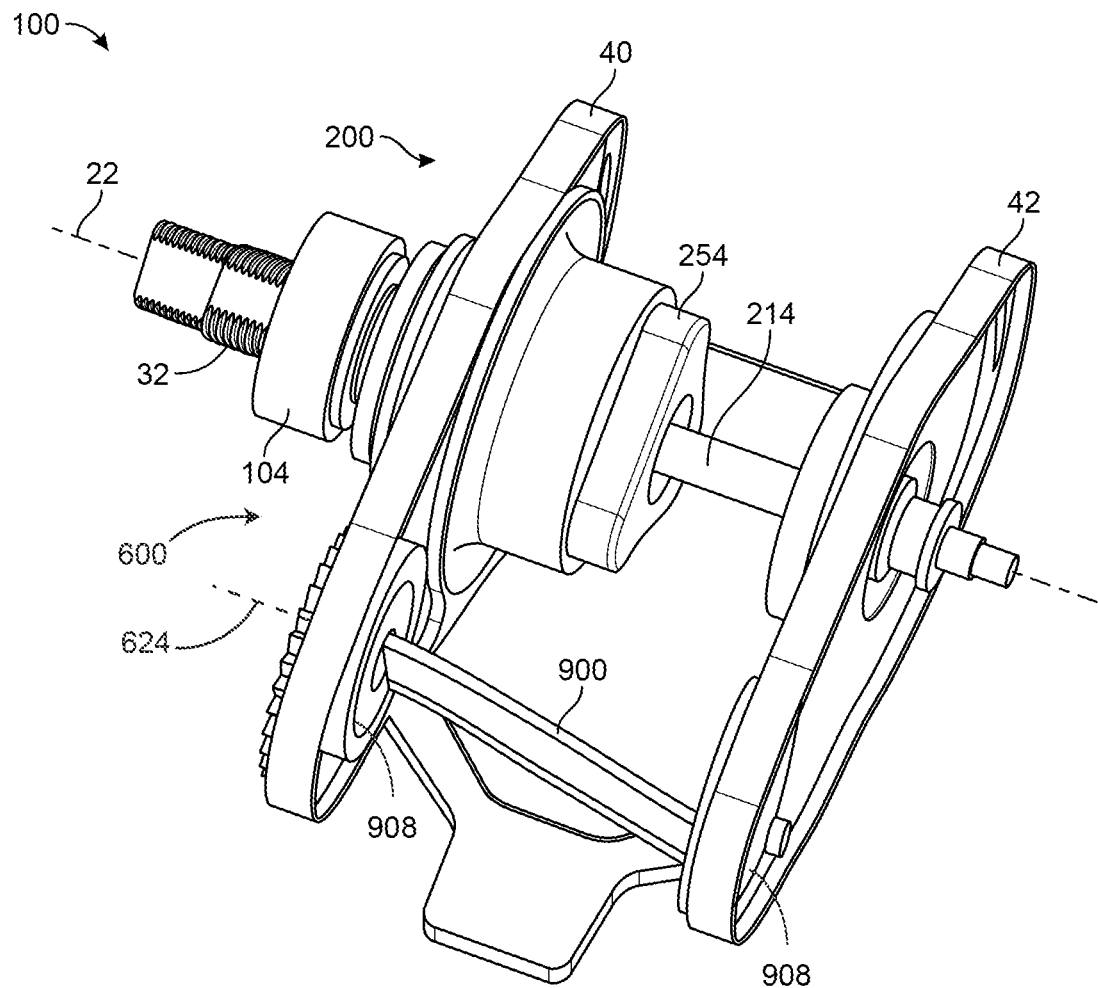
FIG. 3 is a perspective view of a portion of the baitcaster of FIG. 1, according to an exemplary embodiment.

Referring particularly to FIGS. 1-3, a fishing reel, a baitcasting reel, a baitcaster, etc., shown as fishing reel 10 includes a rod, a pole, an elongated member, a flexible member, etc., shown as rod 14 and a reel apparatus, a reel mechanism, a reel assembly, a fishing line retrieval apparatus, etc., shown as reel 12. Reel 12 is fixedly coupled, attached, mounted, etc., with rod 14. In some embodiments, reel 12 is fixedly coupled with rod 14 through mounts, attachment members, etc., shown as mount 18. Mount 18 may extend from a bottom portion of reel 12 and fixedly couple with rod 14.

Reel 12 includes a spool, a barrel, a cylindrical member, etc., shown as spool 20. Spool 20 may be rotatably coupled with an input shaft, a rotatable shaft, a shaft, etc., shown as input shaft 32 such that spool 20 rotates when input shaft 32 is turned. In some embodiments, input shaft 32 is rotatably or fixedly coupled with a handle 36. An axis 22 (e.g., a spool axis, an input axis, etc.) extends through input shaft 32 and spool 20. Input shaft 32 and spool 20 can be co-axial with each other about axis 22. Handle 36 facilitates an input torque to input shaft 32 about axis 22 for driving spool 20. In some embodiments, handle 36 and input shaft 32 are configured to rotate in a first direction (e.g., direction 24) to take-up fishing line 26 so that fishing line 26 is wound onto spool 20.

Fishing line 26 can extend along rod 14 and may be guided by one or more eyelets 46. Eyelets 46 can be positioned along rod 14 and can include an opening, a hole, an aperture, etc., through which fishing line 26 passes. Fishing line 26 may extend from an eyelet 46 that is most proximate reel 12 onto spool 20. Rod 14 defines a central axis 34 that extends longitudinally through a center of rod 14. Fishing line 26 may be guided from eyelet 46 that is most proximate reel 12 to spool 20. Fishing line 26 that is between the eyelet 46 most proximate reel 12 and central axis 34 may define an angle θ. The angle θ may change from a maximum positive value $θ_{+,max}$ to a maximum negative value $θ_{-,max}$ as fishing line 26 is taken up or reeled onto spool 20.

Reel 12 includes a first or a handle-side body member, housing member, structural member, etc., shown as first body member 28, and a second body member, housing member, structural member, etc., shown as second body member 30. First body member 28 and second body member 30 can define opposite sides of reel 12. Spool 20 can be positioned between first body member 28 and second body member 30 and may extend between first body member 28 and second body member 30. Spool 20 can be supported or rotatably coupled on either end with first body member 28 and second body member 30. Spool 20 may rotate relative to first body member 28 and second body member 30.

Reel 12 includes a guide member 900 that is configured to extend between first body member 28 and second body member 30 and be driven to rotate by rotation of handle 36. In some embodiments, guide member 900 is configured to engage fishing line 26 at a contact point 901. Fishing line 26 may be guided onto spool 20 from contact point 901. For example, fishing line 26 may extend from contact point 901 onto spool 20 where it is then wound onto spool 20. Rotation of guide member 900 can result in reciprocating translation of contact point 901. For example, as guide member 900 rotates, contact point 901 may shift back and forth along guide member 900 between opposite ends of guide member 900. In this way, fishing line 26 is guided and wound onto spool 20 along an entire longitudinal length of spool 20, thereby facilitating an even distribution of fishing line 26 on spool 20 and reducing knotting and/or bunching of fishing line 26 on spool 20 (e.g., an uneven distribution of fishing line 26). Evenly distributing and winding fishing line 26 on spool 20 can reduce a likelihood of fishing line 26 snagging, knotting, or becoming tangled when fishing line 26 is let out (e.g., released) from spool 20 (e.g., for casting operations).

Referring still to FIGS. 1-2, input shaft 32 extends through first body member 28 and protrudes outwards from first body member 28. Handle 36 is coupled with input shaft 32 exterior of first body member 28 so that handle 36 can be operated by a fisherman's right hand while rod 14 is held by the fisherman's left hand. In other embodiments, input shaft 32 extends outwards through second body member 30 so that handle 36 is operated by the fisherman's left hand while rod 14 is held by the fisherman's right hand.

Input shaft 32 is configured to turn and drive rotation of spool 20 through a spool drive mechanism, a compound planetary gear assembly, a gear train, a gear assembly, etc., shown as spool drive mechanism 100. Spool drive mechanism 100 can be configured to receive torque from input shaft 32 and transfer the torque to spool 20 so that spool 20 rotates to take up or wind fishing line 26 onto spool 20.

Referring particularly to FIG. 1, reel 12 includes an input member, a bar, a rotatable linkage, a translatable member, a lever, a button, etc., shown as lever 38. Lever 38 may extend between first body member 28 and second body member 30 and may be pivotable, rotatable, and/or translatable between a first position and a second position (e.g., a first lever position and a second lever position). In some embodiments, lever 38 is configured to be transitioned between the first position and the second position to selectively couple input shaft 32 with spool 20.

Referring still to FIG. 1, reel 12 can include a first structural member, a first frame member, etc., shown as first frame member 40, and a second structural member, a second frame member, etc., shown as second frame member 42. First frame member 40 and second frame member 42 can be parallel with each other and may both extend in a longitudinal direction that is defined by central axis 34. First frame member 40 and second frame member 42 may be positioned within first body member 28 and second body member 30, respectively or may be positioned within an inner volume that is at least partially defined by first body member 28 and second body member 30.

Referring still to FIG. 1, reel 12 can include a central body member, a central housing, etc., shown as body member 44. In some embodiments, body member 44 extends between first body member 28 and second body member 30. First body member 28 and body member 44 may cooperatively define a first inner volume in which first frame member 40 is positioned. Second body member 30 and body member 44 may cooperatively define a second inner volume in which second frame member 42 is positioned.

Line Guide

Figure 8:
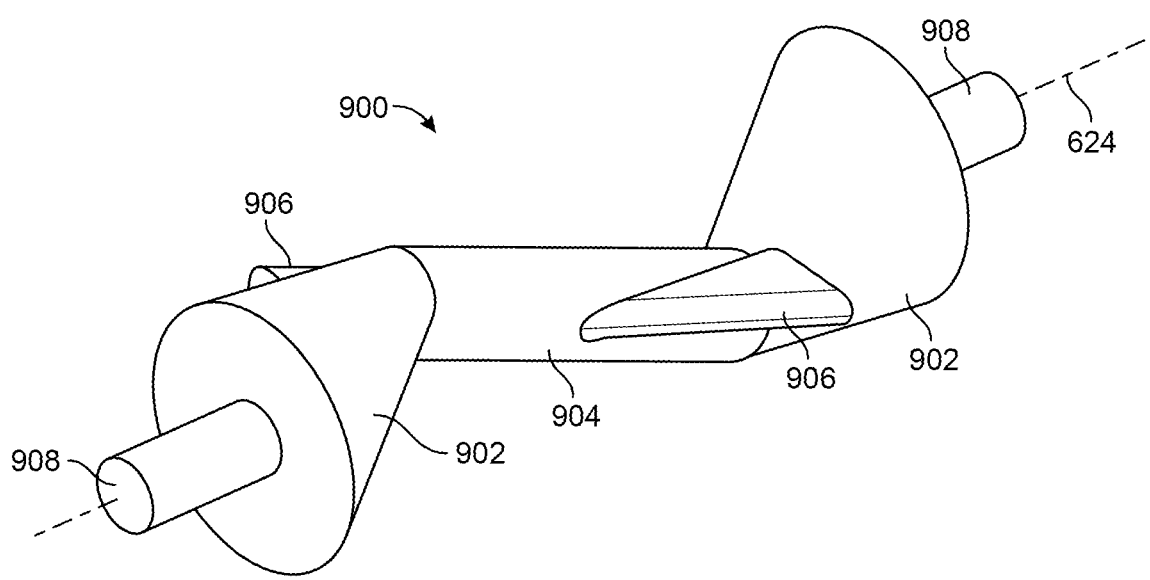
FIG. 8 is a perspective view of the line guide of the baitcaster FIG. 1, according to an exemplary embodiment.

Referring particularly to FIGS. 1 and 8, guide member 900 can be fixedly coupled on a shaft 908 and driven to rotate about an axis 624 that extends longitudinally and centrally through guide member 900. Guide member 900 can be positioned such that guide member 900 is parallel with axis 22. In some embodiments, axis 34 extends through guide member 900 in a lateral direction (e.g., in a direction that is perpendicular to axis 22). Guide member 900 can be rotated and define one or more surfaces that engage fishing line 26 before it is fed to spool 20. Guide member 900 can be driven to rotate in a single direction by handle 36 (e.g., through line guide mechanism 600). As guide member 900 rotates, fishing line 26 engages the one or more surfaces of guide member 900 and translationally reciprocates fishing line 26 back and forth along guide member 900. This facilitates an even distribution of fishing line 26 onto spool 20.

Guide member 900 includes a pair of elongated members, shaft members, etc., shown as axles 908 at opposite ends of guide member 900. Axles 908 can be configured to each be received within a corresponding aperture, bearing, receiving portion, etc., of first body member 28 and second body member 30. Guide member 900 can be supported between first body member 28 and second body member 30 through axles 908 at each end. Axles 908 can rotatably couple with first body member 28 and second body member 30 such that guide member 900 rotates relative to first body member 28 and second body member 30.

Axles 908 can extend from frustum-shaped collars 902 that are asymmetric relative to an axis of rotation of guide member 900 (e.g., axis 624). A central section, portion, segment, etc., shown as central segment 904 is disposed between collars 902 that extends obliquely or diagonally through axis 52. A transition segment or fillet 906 connects each opposed end of central segment 904 to its respective collar 902. Transition segments 906 define line engaging surfaces that can be co-planar or in planes that are parallel with each other.

As guide member 900 rotates about axis 624 (e.g., being driven by or through line guide mechanism 600), fishing line 26 engages guide member 900 and is directed translationally back and forth along guide member 900. Guide member 900 can be rotated in a single direction (e.g., clockwise or counter-clockwise) such that fishing line 26 engages guide member 900 and is directed to different lateral positions on spool 20 in a repeating manner. Guide member 900 can be positioned ahead of spool 44 such that fishing line 26 engages and is directed by guide member 900 before being wound onto spool 20.

Line Guide Mechanism

Referring particularly to FIGS. 3-7, line guide mechanism 600 is shown in greater detail, according to an exemplary embodiment. Line guide mechanism 600 can be positioned on a handle end 274 of baitcaster 12. In some embodiments, line guide mechanism 600 is positioned at handle end 274 of baitcaster 12 within an inner volume defined by first body member 28 and first frame member 40. Line guide mechanism 600 can be configured to transfer rotational kinetic energy from input shaft 32 to guide member 900 to rotate guide member 900 for take-up operations of baitcaster 12. In some embodiments, line guide mechanism 600 is also configured to transition guide member 900 between a first position, a first state, a take-up state, an engagement state, and a second position, a second state, a let-out state, a disengaged state, etc.

In some embodiments, first frame member 40 includes a rim, a peripheral protrusion, an annular protrusion, a circumferential protrusion, etc., shown as protrusion 634. Protrusion 634 extends longitudinally outwards and extends along an entire outer periphery of first frame member 40.

Line guide mechanism 600 may be contained or enclosed within first body member 28 and first frame member 40. In some embodiments, line guide mechanism 600 is configured to receive rotational kinetic energy (e.g., torque) from a ring gear 202 of spool drive mechanism 100. For example, ring gear 202 may be rotatably fixedly coupled or selectably rotatably fixedly coupled with input shaft 32 such that ring gear 202 rotates or turns with rotation or turning of input shaft 32.

Line guide mechanism 600 includes a compound gear 608 a second gear 606, a first linkage 602, a second linkage 604, and a release linkage 640. Compound gear 608, second gear 606, first linkage 602, second linkage 604, and release linkage 640 may be rotatably or pivotally coupled with first frame member 40 and can all be enclosed by first body member 28 and first frame member 40.

In some embodiments, compound gear 608 is rotatably coupled and translationally fixedly coupled with first frame member 40. For example, compound gear 608 may be free to rotate relative to first frame member 40. In some embodiments, compound gear 608 includes a shaft, a cylindrical member, an elongated member, etc., shown as shaft 614 that extends in a direction parallel with axis 22. Shaft 614 may extend towards distal end 276 of baitcaster 12 and can rotatably couple with first frame member 40 through a bearing, a ball bearing, a sleeve bearing, etc. In some embodiments, shaft 614 terminates within first frame member 40 or extends through first frame member 40.

Compound gear 608 can include a first sub-gear 610 and a second sub-gear 612. First sub-gear 610 may have a radius or a diameter that is greater than a radius of diameter of second sub-gear 612. First sub-gear 610 includes teeth 618 and second sub-gear 612 includes teeth 620. Teeth 618 of first sub-gear 610 may have a diametral pitch that is greater than a diametral pitch of teeth 620 of second sub-gear 612. First sub-gear 610 and second sub-gear 612 may be rotatably fixedly coupled with shaft 614 (e.g., integrally formed, press fit, keyed, frictionally fit, slip fit, etc.) so that first sub-gear 610 and second sub-gear 612 are translationally fixedly coupled with first frame member 40.

First sub-gear 610 is configured to engage, be driven by, mesh, interface with, etc., ring gear 202 through teeth 618 of first sub-gear 610 and teeth 616 of ring gear 202. In some embodiments, ring gear 202 rotates in a same direction as spool 20. For example, ring gear 202 may be rotatably fixedly coupled (e.g., selectably, adjustably, etc.) with spool 20 such that ring gear 202 and spool 20 rotate about axis 22 in unison. In some embodiments, rotation of input shaft 32 in direction 24 results in rotation of spool 20 and ring gear 202 in direction 25 about axis 22 (opposite direction 24).

Ring gear 202 may drive first sub-gear 610 and second sub-gear 612 to rotate about axis 622 in direction 656 through the engagement between ring gear 202 and first sub-gear 610. Second sub-gear 612 can, drive, rotate, etc., second gear 606 through engagement or meshing between teeth 620 of second sub-gear 612 and teeth 660 of second gear 606. In some embodiments, rotation of first sub-gear 610 about axis 622 drives rotation of second gear 606 about axis 624 in direction 658. In this way, compound gear 608 may be driven by ring gear 202 and drive second gear 606.

Second gear 606 can be translationally fixedly coupled with first frame member 40. In some embodiments, second gear 606 is also rotatably coupled with first frame member 40 such that second gear 606 may rotate relative to first frame member 40. Second gear 606 can be rotatably fixedly coupled with guide member 900 so that rotation of second gear 606 drives rotation of guide member 900 about axis 624. In some embodiments, axis 624 extends longitudinally through a shaft, a pin, an elongated member, a cylindrical member, etc., shown as shaft 626. Shaft 626 may be fixedly coupled (e.g., rotatably fixedly coupled, translationally fixedly coupled, etc.) with guide member 900 so that rotation of shaft 626 and second gear 606 drive rotation of guide member 900.

Figure 4:
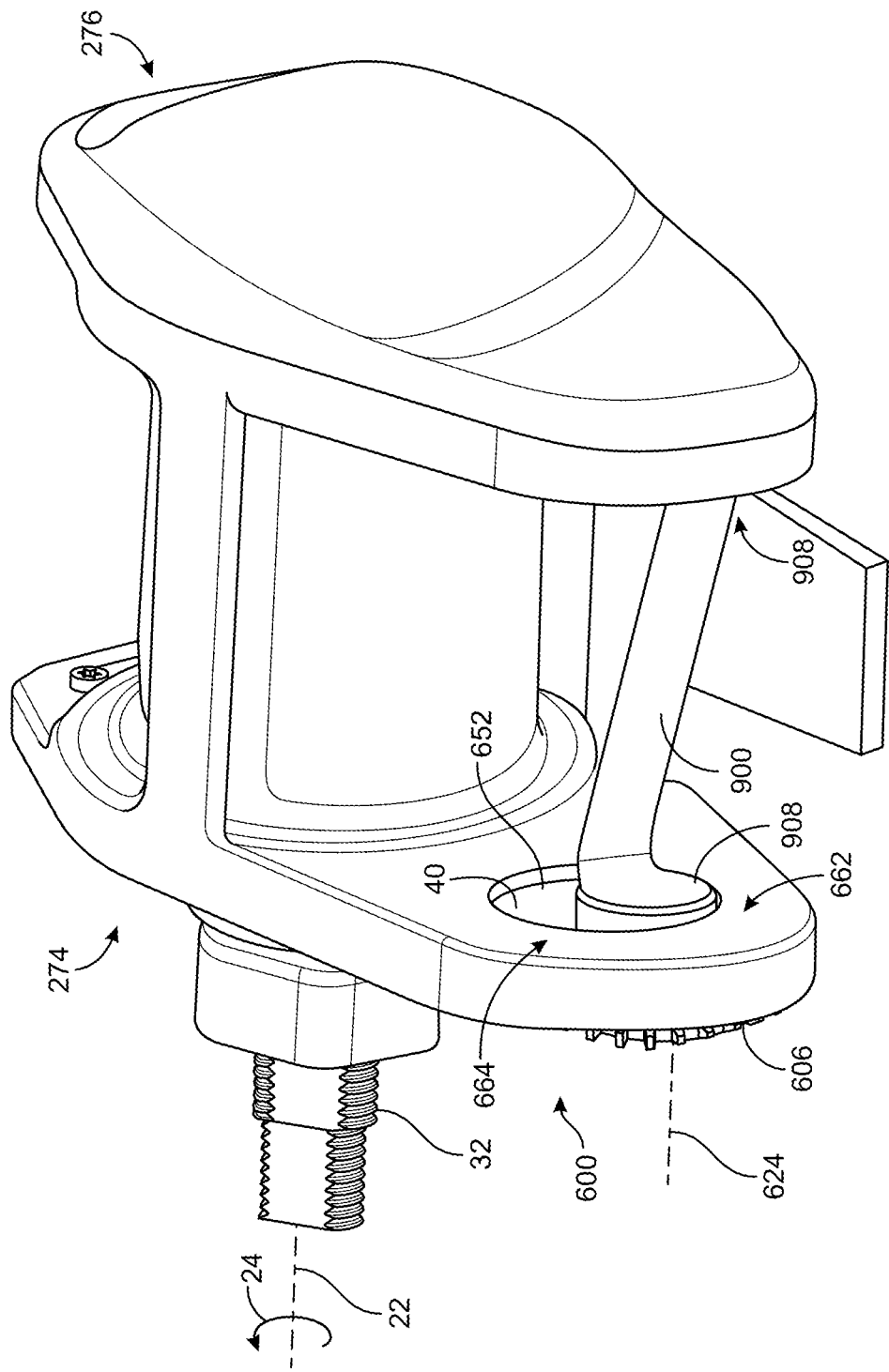
FIG. 4 is a perspective view of the baitcaster of FIG. 1, according to an exemplary embodiment.
Figure 5:
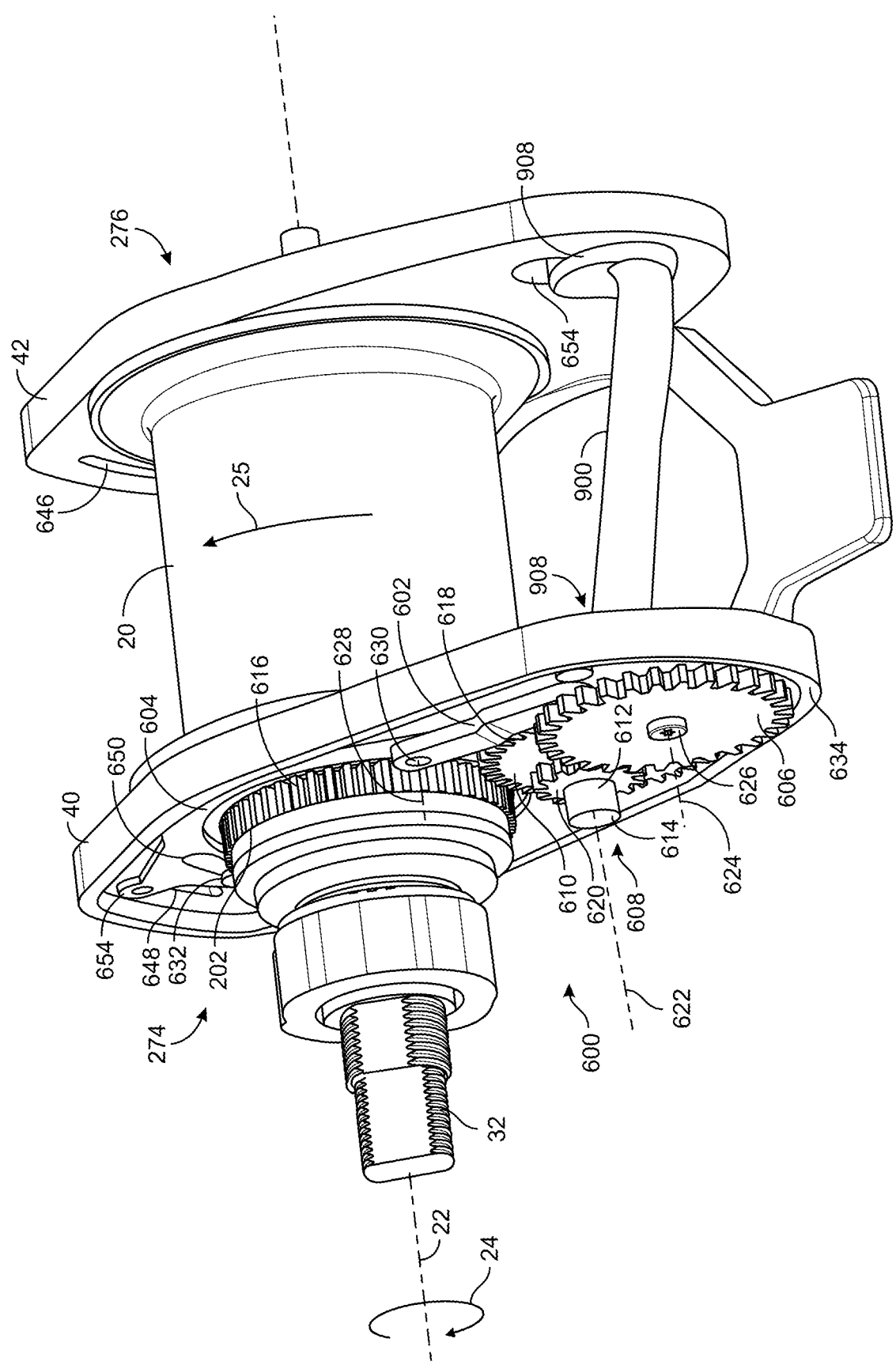
FIG. 5 is a perspective view of the baitcaster of FIG. 1, showing the line guide and the line guide mechanism in greater detail, according to an exemplary embodiment.

Referring particularly to FIGS. 4 and 5, first frame member 40 and second frame member 42 can each include a slot, opening, channel, aperture, etc., shown as first slot 652 and second slot 654. First slot 652 and second slot 654 can extend through an entire thickness of first frame member 40 and second frame member 42, respectively. First slot 652 and second slot 654 are configured to receive axles 908 therewithin. In some embodiments, first slot 652 and second slot 654 have a width that is substantially equal to a diameter of axles 908. First slot 652 and second slot 654 may have rounded ends that have a radius of curvature substantially equal to a radius of axles 908. In some embodiments, an outer surface or a radially outwards facing surface of axles 908 is slidably coupled with an inner surface of first slot 652 and second slot 654. Guide member 900 may rotate about axis 624 within first slot 652 and second slot 654.

In this way, turning input shaft 32 may drive guide member 900 to rotate during a take-up operation of reel 12. In some embodiments, spool 20 and ring gear 202 are selectably rotatably coupled with input shaft 32. For example, spool 20 and ring gear 202 may be de-coupled from input shaft 32 by moving, pivoting, translating, rotating, etc., lever 38 for let-out operations of reel 12 (e.g., to let out fishing line 26).

Referring to FIGS. 3-7, guide member 900 is translatable or transitionable along first slot 652 and second slot 654 between a first position (shown in FIGS. 3-7) at a lower portion, a bottom end, a first end, a proximate end, etc., of slots 652-654, shown as lower end 662, and a second position at an upper portion, an upper end, a second end, a proximate end, etc., of slots 652-654, shown as upper end 664. In some embodiments, guide member 900 is transitioned into the second position at upper end 664 of slots 652-654 for take-up operations of reel 12 (e.g., so that guide member 900 engages or guides fishing line 26 before it is provided or wound onto spool 20). Guide member 900 is transitioned into the first position at lower end 662 of slots 652-654 for let-out operations of reel 12 (e.g., so that guide member 900 does not engage or guide fishing line 26 as it is let-out or un-wound from spool 20). Guide member 900 can be driven to translate in direction 670 along slots 652-654 from the first position to the second position by movement of lever 38 through line guide mechanism 600.

Figure 6:
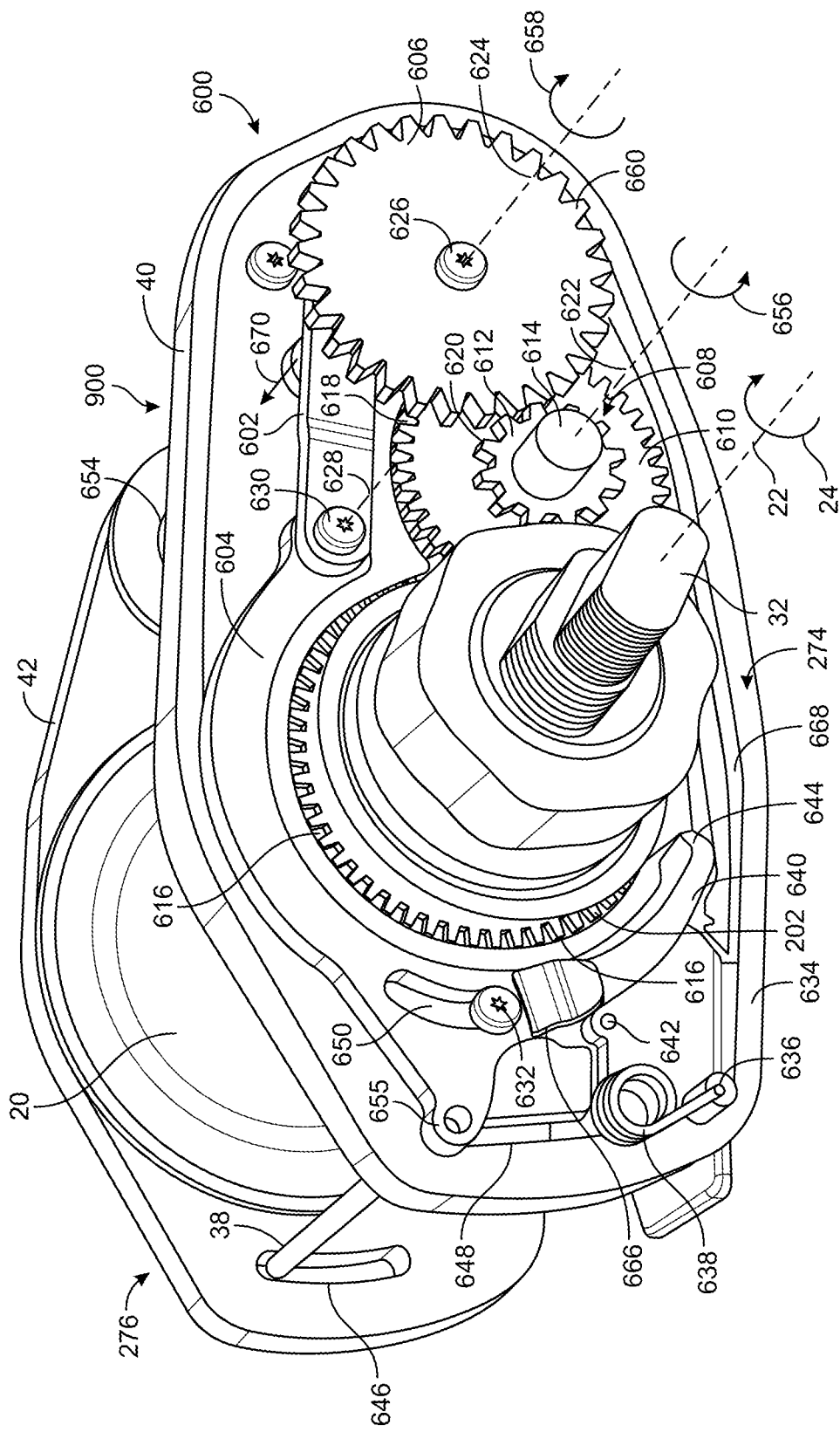
FIG. 6 is a perspective view of the baitcaster of FIG. 1, showing the line guide and the line guide mechanism in greater detail, according to an exemplary embodiment.
Figure 7:
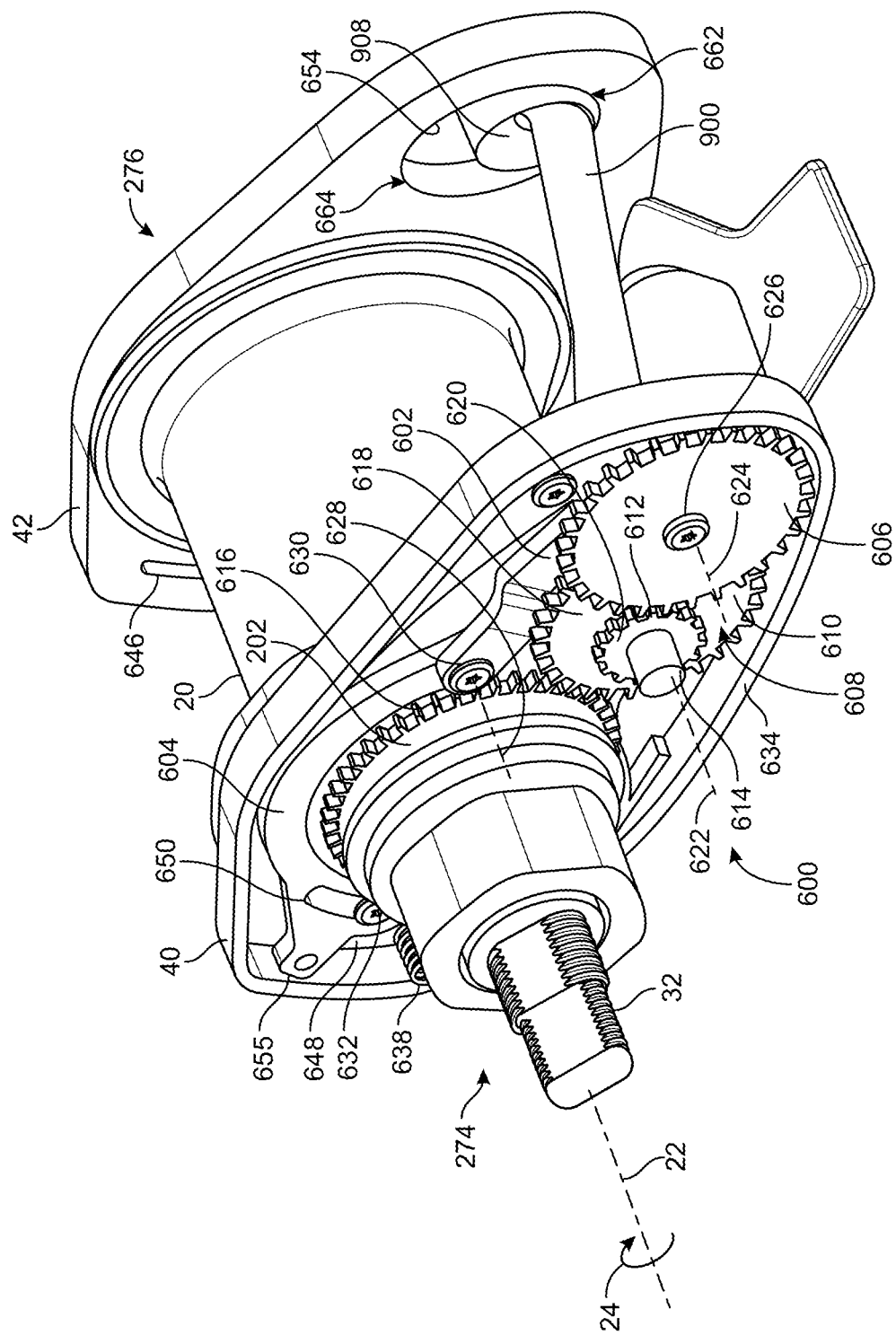
FIG. 7 is a perspective view of the baitcaster of FIG. 1, showing the line guide and the line guide mechanism in greater detail, according to an exemplary embodiment.

Referring particularly to FIGS. 6-7, first linkage 602 can be pivotally coupled with second linkage 604 at pivotal connection 630. In some embodiments, pivotal connection 630 defines an axis 628 about which first linkage 602 and second linkage 604 pivot. First linkage 602 extends between pivotal connection 630 and second gear 606. First linkage 602 pivotally couples with second linkage 604 at a first or proximate end, and pivotally couples with guide member 900, shaft 626, or second gear 606 at a second or distal end. First linkage 602 can have a generally straight or elongated shape that extends between pivotal connection 630 and second gear 606. Second linkage 604 may have a generally arcuate or curved shape that extends at least partially around ring gear 202. Second linkage 604 may include a first or proximate end that pivotally couples with first linkage 602, and a second or distal end that slidably and/or pivotally couples with a pin 632.

Second linkage 604 includes a protrusion, a tab, a flange, an engagement portion, a connection portion, etc., shown as lever engagement portion 655. Lever engagement portion 655 can be positioned at a second or distal end of second linkage 604. Lever engagement portion 655 may be aligned with or overlap with a slot 648 of first frame member 40. Slot 648 can be positioned at a rear portion of first frame member 40 and may have an arcuate or curved shape. In some embodiments, lever 38 extends through and slidably couples with slot 648. Lever 38 may fixedly couple with lever engagement portion 655 of second member 604 and may translate along slot 648. Second frame member 42 can also include a corresponding slot 646 that has a same shape as slot 648. Lever 38 may extend between first frame member 40 and second frame member 42 and slidably couple with first frame member 40 and second frame member 42. Lever 38 may be configured to translate along slots 646 and 648 between a first position at an upper end of slots 646 and 648 and a second position at a lower end of slots 646 and 648.

When lever 38 is at the first position (shown in FIGS. 6 and 7), guide member 900 is driven to the first position at lower end 662 of slots 652-654 for let-out operations of reel 12. When lever 38 is in the second position at the lower end of slots 646 and 648, guide member 900 is driven or translated to the second position at upper end 664 of slots 646 and 648 for take-up operations of reel 12. In this way, lever 38 can be transitioned or translated along slots 646 and 648 between the first position and the second position to transition guide member 900 between a position for take-up operations of reel 12 (e.g., to guide fishing line 26 onto spool 20) and a position for let-out operations of reel 12 (e.g., to let fishing line 26 unwind from spool 20).

Second linkage 604 may be driven to pivot about pivotal connection 630 or axis 628 by movement, translation, etc., of lever 38 along slots 646 and 648. For example, moving lever 38 downwards along slots 646 and 648 may pivot second linkage 604 in a counter-clockwise direction about axis 628, thereby loading first linkage 602 into tension. First linkage 602 may draw or pull guide member 900 and shaft 626 from the first position at lower end 662 to the second position at upper end 664 of slots 652-654.

In some embodiments, pin 632 is translationally fixedly coupled with first frame member 40 and extends or protrudes through a slot 650 (e.g., a guide slot) of second linkage 604. Pin 632 may guide a path of motion of second linkage 604 as second linkage 604 is driven to move, pivot, translate, etc., by lever 38. Slot 650 can be positioned on second linkage 604 proximate lever engagement portion 655 (e.g., at a rear end of reel 12, or at an end of reel 12 that is opposite the end where fishing line 26 is fed).

Second linkage 604 can also include an engagement portion, a protrusion, etc., shown as engagement portion 666. Engagement portion 666 is configured to directly contact, abut, engage, drive, etc., a corresponding portion of a release linkage 640. In some embodiments, engagement portion 666 is pivotally coupled with release linkage 640. Release linkage 640 of line guide mechanism 600 can function both as a locking linkage and a release linkage. In some embodiments, release linkage 640 is pivotally coupled with a torsional spring 638 at aperture 642. Aperture 642 may be proximate a portion of release linkage 640 that is driven by, contacted, or pivotally coupled with engagement portion 666. In some embodiments, release linkage 640 includes a hook, an engagement hook, etc., shown as hook 644 at an opposite end of release linkage 640. Hook 644 can be configured to engage, interlock with, mesh with, etc., teeth 616 of ring gear 202.

Release linkage 640 may be driven (e.g., by being rotated or pivoted) between a locked position (shown in FIG. 6) and a released position. When release linkage 640 is in the locked position, hook 644 engages teeth 616 of ring gear 202, thereby rotatably fixing ring gear 202 at a current angular position. When release linkage 640 is in the unlocked position, hook 644 is driven out of engagement with teeth 616 of ring gear 202, thereby allowing ring gear 202 to rotate. Release linkage 640 can be pivoted between the locked position and the released position by translation of lever 38 along slots 646-648. For example, when lever 38 is in the first position at the upper end of slots 646-648, hook 644 may be dis-engaged from teeth 616 of ring gear 202. When lever 38 is transitioned into the second position at the lower end of slots 646-648, hook 644 is to translate and pivot along a guide protrusion 668 of first frame member 40 that extends proximate protrusion 634.

A rear portion of hook 644 may slidably couple with, contact, engage, etc., a corresponding surface of first frame member 40 defined by guide protrusion 668. Moving lever 38 downwards along slots 646-648 drives release linkage 640 to translate and pivot relative to engagement portion 666 of second linkage 604 until hook 644 engages teeth 616 of ring gear 202. In some embodiments, torsional spring 638 is configured to bias release linkage 640 to translate into the disengaged state (shown in FIG. 6). For example, torsional spring 638 can be pivotally coupled at a first end with first frame member 40 through an aperture 636 and pivotally coupled with release linkage 640 at a second or distal end. Torsional spring 638 may bias release linkage 640 into the disengaged state (shown in FIG. 6), thereby biasing lever 38 into the first position at the upper end of slots 646-648.

In some embodiments, hook 644 is configured to engage teeth 616 such that ring gear 202 is prevented from rotating in a first direction (e.g., in a direction opposite direction 24) but is free to rotate in a second direction (e.g., in direction 24). When lever 38 is transitioned between the first position at the upper end of slots 646-648 and the second position at the lower end of slots 646-648, second gear 606 may maintain meshing or engagement with second sub-gear 612. For example, second gear 606 may translate relative to second sub-gear 612 along an arc path centered at axis 622 of compound gear 608, thereby maintaining engagement between teeth 660 of second gear 606 and teeth 620 of second sub-gear 612.

In some embodiments, transitioning or translating lever 38 into the second position at the bottom or lower end of slots 646-648 rotatably fixedly couples input shaft 32 from spool 20 and ring gear 202 or rotatably de-couples input shaft 32 from spool 20. In this way, a user may operate lever 38 to simultaneously or concurrently transition guide member 900 between the let-out position and the take-up position, while selectively de-coupling or rotatably fixedly coupling input shaft 32 with spool 20 (e.g., for take-up or let-out operations of reel 12).

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A baitcaster for retrieving a fishing line, the baitcaster comprising:
    a first frame member comprising a first slot;
    a second frame member positioned apart from the first frame member and comprising a second slot;
    a spool positioned between the first frame member and the second frame member, the spool configured to be rotated about a spool axis to take up the fishing line; and
    a guide member extending between the first slot of the first frame member and the second slot of the second frame member, the guide member selectably transitionable between a first position and a second position along the first slot and the second slot, wherein the guide member is configured to rotate about an axis extending centrally therethrough;
    a line guide mechanism comprising a plurality of linkages coupled with each other, the line guide mechanism configured to transition the guide member between the first position and the second position;
    wherein the guide member is configured to engage the fishing line when in the second position and disengage the fishing line when transitioned into the first position.

2. The baitcaster of claim 1, wherein the guide member is configured to engage the fishing line and rotate about an axis parallel with the spool axis to reciprocatively guide the fishing line to be wound onto the spool at different positions along the spool axis when in the second position.

3. The baitcaster of claim 1, further comprising:
    a lever positioned on an opposite side of the spool as the guide member, the lever extending between the first frame member and the second frame member, the lever translatable along a pair of slots of the first frame member and the second frame member, the lever selectably transitionable between a first lever position and a second lever position at opposite ends of the pair of slots.

4. The baitcaster of claim 3, wherein the plurality of linkages of the line guide mechanism are configured to be driven by the lever to drive the guide member to transition between the first position and the second position.

5. The baitcaster of claim 4, wherein the line guide mechanism is coupled with the first frame member and the plurality of linkages comprise:
    a first linkage coupled with the guide member;
    a second linkage coupled with the first linkage and the lever at opposite ends;
    a release linkage pivotally coupled with the first frame member and configured to be driven to pivot by an engagement portion of the second linkage, the release linkage pivotable between a locked position and a released position, the release linkage configured to limit rotation of the guide member when in the locked position;
    wherein transitioning the lever from the first lever position to the second lever position drives the guide member from the first position to the second position for take up of the fishing line and drives the release linkage to the released position so that rotation of the guide member is not limited.

6. The baitcaster of claim 5, wherein the line guide mechanism further comprises:
    a torsional spring configured to bias the release linkage into the released position; and
    a pin fixedly coupled with the first frame member and received within a guide slot of the second frame member, the pin and the guide slot configured to guide translation of the second frame member when the lever is transitioned between the first lever position and the second lever position.

7. The baitcaster of claim 5, wherein the line guide mechanism further comprises:
    a ring gear configured to be driven by an input shaft to rotate about the spool axis;
    a compound gear coupled with the first frame member and configured to be driven by the ring gear; and
    a second gear configured to be driven to rotate by the compound gear to drive the guide member to rotate about the axis extending centrally through the guide member.

8. The baitcaster of claim 7, wherein the compound gear comprises a first sub-gear and a second sub-gear, the first sub-gear configured to engage teeth of the ring gear, and the second sub-gear configured to engage teeth of the second gear.

9. The baitcaster of claim 7, wherein the second gear is rotatably fixedly coupled with the guide member and configured to translate with the guide member as the guide member is driven to translate between the first position and the second position by the first linkage, the second linkage, and the lever.

10. The baitcaster of claim 4, wherein the line guide mechanism is further configured to receive an input rotation from an input shaft of the baitcaster and drive the guide member to rotate about the axis extending centrally through the guide member.

11. A fishing rod comprising:
a rod; and
baitcaster for retrieving a fishing line, the baitcaster comprising:
a first frame member comprising a first slot;
a second frame member positioned apart from the first frame member and comprising a second slot;
a spool positioned between the first frame member and the second frame member, the spool configured to be rotated about a spool axis to take up the fishing line;
a guide member extending between the first slot of the first frame member and the second slot of the second frame member, the guide member selectably transitionable between a first position and a second position along the first slot and the second slot and configured to rotate about an axis extending centrally through the guide member; and
a line guide mechanism comprising a plurality of linkages coupled with each other, the line guide mechanism configured to transition the guide member between the first position and the second position;
wherein the guide member is configured to engage the fishing line when in the second position for take up of the fishing line and disengage the fishing line when transitioned into the first position for let out of the fishing line.

12. The fishing rod of claim 11, wherein the guide member is configured to engage the fishing line and rotate about an axis parallel with the spool axis to reciprocatively guide the fishing line to be wound onto the spool at different positions along the spool axis when in the second position.

13. The fishing rod of claim 11, wherein the baitcaster further comprises:
a lever positioned on an opposite side of the spool as the guide member, the lever extending between the first frame member and the second frame member, the lever translatable along a pair of slots of the first frame member and the second frame member, the lever selectably transitionable between a first lever position and a second lever position at opposite ends of the pair of slots.

14. The fishing rod of claim 13, wherein the plurality of linkages of the line guide mechanism are configured to be driven by the lever to drive the guide member to transition between the first position and the second position.

15. The fishing rod of claim 14, wherein the line guide mechanism is coupled with the first frame member and the plurality of linkages comprises:
a first linkage coupled with the guide member;
a second linkage coupled with the first linkage and the lever at opposite ends;
a release linkage pivotally coupled with the first frame member and configured to be driven to pivot by an engagement portion of the second linkage, the release linkage pivotable between a locked position and a released position, the release linkage configured to limit rotation of the guide member when in the locked position;
wherein transitioning the lever from the first lever position to the second lever position drives the guide member from the first position to the second position for take up of the fishing line and drives the release linkage to the released position so that rotation of the guide member is not limited.

16. The fishing rod of claim 15, wherein the line guide mechanism further comprises:
a ring gear configured to be driven by an input shaft to rotate about the spool axis;
a compound gear coupled with the first frame member and configured to be driven by the ring gear; and
a second gear configured to be driven to rotate by the compound gear to drive the guide member to rotate about the axis extending centrally through the guide member.

17. The fishing rod of claim 16, wherein the compound gear comprises a first sub-gear and a second sub-gear, the first sub-gear configured to engage teeth of the ring gear, and the second sub-gear configured to engage teeth of the second gear.

18. The fishing rod of claim 16, wherein the second gear is rotatably fixedly coupled with the guide member and configured to translate with the guide member as the guide member is driven to translate between the first position and the second position by the first linkage, the second linkage, and the lever.

19. The fishing rod of claim 14, wherein the line guide mechanism is further configured to receive an input rotation from an input shaft of the baitcaster and drive the guide member to rotate about the axis extending centrally through the guide member.

20. A baitcaster comprising:
a spool configured to be driven to take up a fishing line;
a guide member configured to transition between a first state for let out of the fishing line and a second state for take up of the fishing line, the guide member configured to engage the fishing line at a contact point and guide the fishing line to the spool from the contact point when in the second state, the guide member configured to be driven to rotate to reciprocatively translate the contact point along a length of the guide member; and
a line guide mechanism comprising a plurality of linkages pivotally coupled with each other and configured to apply a pulling force or a pushing force to the guide member to transition the guide member between the first state and the second state in response to a user input.

* * * * *